March 11, 1924.  
E. N. BUTTERFIELD  
1,486,361  
HITCHING DEVICE FOR WHIFFLETREES AND THE LIKE  
Filed Oct. 12, 1922    2 Sheets-Sheet 1
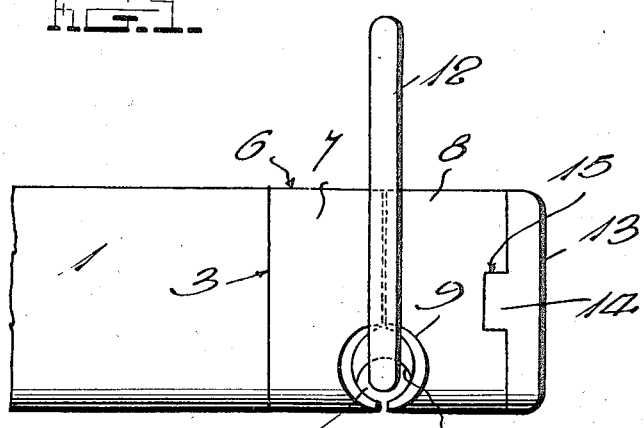
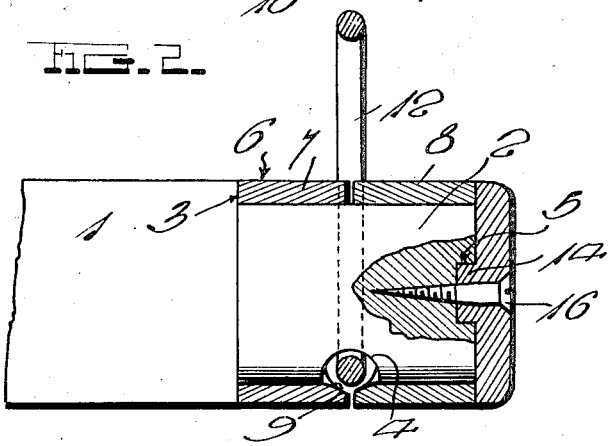
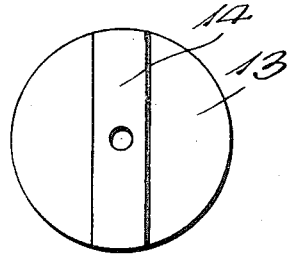
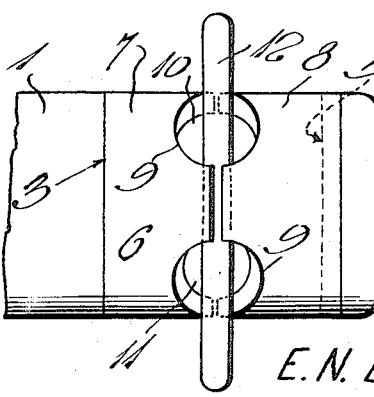
Inventor  
E. N. BUTTERFIELD  
By H. B. Wilson & Co  
Attorneys
Witness  
H. Woodard

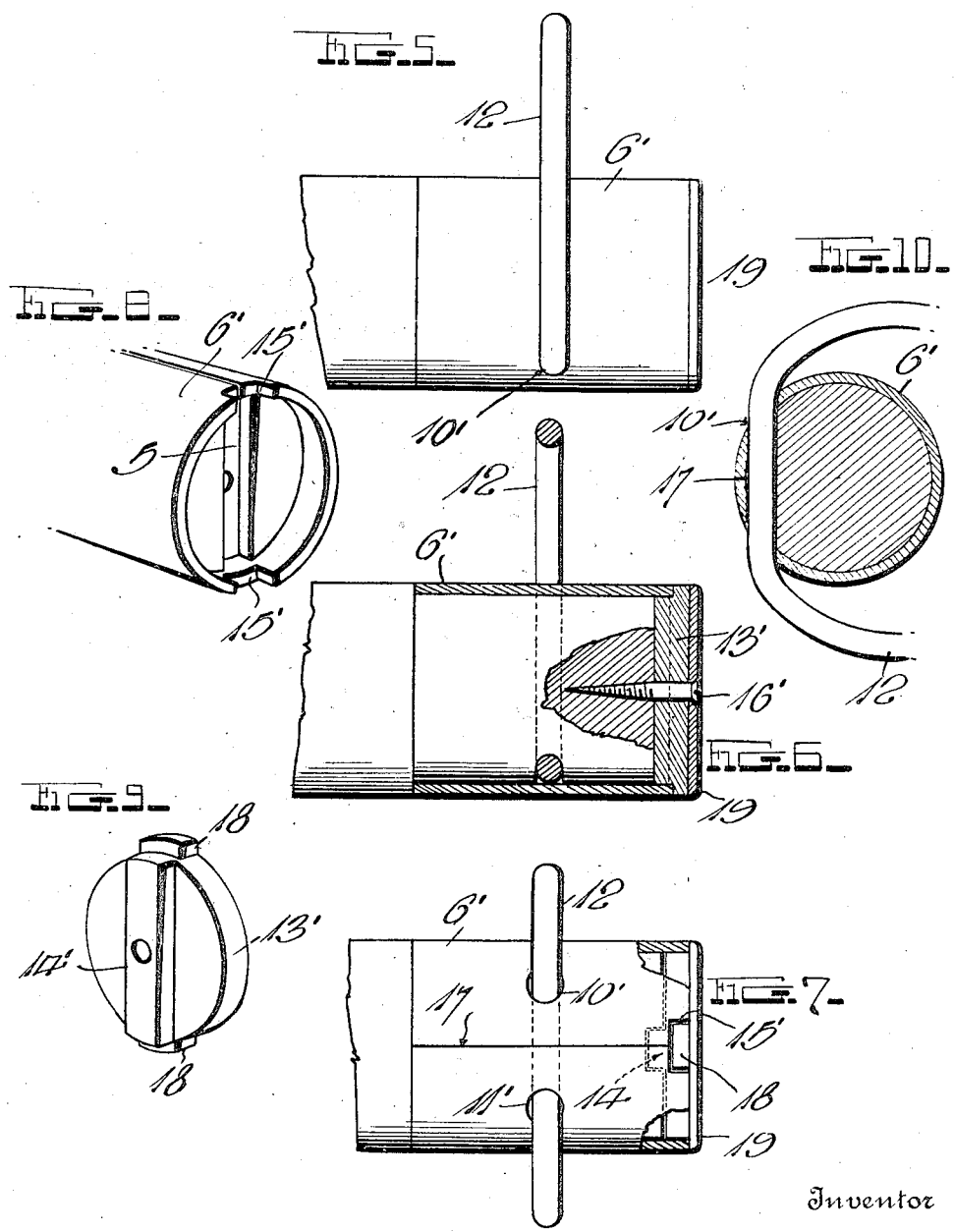

Patented Mar. 11, 1924.

1,486,361

UNITED STATES PATENT OFFICE.

EVERETT N. BUTTERFIELD, OF AUBURN, NEBRASKA.

HITCHING DEVICE FOR WHIFFLETREES AND THE LIKE.

Application filed October 12, 1922. Serial No. 594,080.

*To all whom it may concern:*

Be it known that I, EVERETT N. BUTTERFIELD, a citizen of the United States, residing at Auburn, in the county of Nemaha and State of Nebraska, have invented certain new and useful Improvements in Hitching Devices for Whiffletrees and the like; and I do declare the following to be a full, clear, and exact description of the invention, such as will enable others skilled in the art to which it appertains to make and use the same.

This invention relates generally to draft appliances for carriages and wagons, and particularly to hitching devices for whiffletrees, neck-yokes and the like.

The invention has been designed in order to provide a simple, strong, durable and inexpensive hitching element or device which can be very easily applied to a whiffle-tree, neck yoke or the like.

The novelty in the invention resides in the combination and arrangement of parts, and the various features of construction, which are hereinafter fully described and claimed and shown in the accompanying drawings.

In the accompanying drawings forming a part of this specification:—

Fig. 1 is a side elevation of one end of a whiffle-tree provided with a hitching element constructed in accordance with this invention.

Fig. 2 is a longitudinal sectional view of the end of the whiffle-tree which is shown in Fig. 1;

Fig. 3 is a bottom view of the end of the whiffle-tree which is shown in Fig. 1;

Fig. 4 is an elevation of the inner side or face of the cap which forms a part of the structure shown in Figs. 1, 2 and 3;

Fig. 5 is a side elevation of one end of a whiffle-tree provided with another form of hitching device constructed in accordance with the invention;

Fig. 6 is a longitudinal sectional view of the end of the whiffle-tree shown in Fig. 5;

Fig. 7 is a bottom view of the whiffle-tree shown in Fig. 5, a portion of said view being broken away and some of the parts being shown in section;

Fig. 8 is a perspective view of the whiffle-tree with the cap removed, said view looking toward the end of the whiffle-tree;

Fig. 9 is a perspective view of one of the caps which is fit upon the end of the whiffle-tree; and Fig. 10 is a transverse sectional view of the whiffle-tree shown in Figs. 5, 6 and 7.

In the illustrated embodiment of the invention, the numeral 1 designates a whiffle-tree which is preferably of circular-shape in cross section and which has its end of reduced diameter as at 2 so as to provide an outwardly facing annular shoulder 3. One side of the reduced end portion 2 of the whiffle-tree 1 is provided with a transversely extending groove or notch 4. This groove or notch 4 is located adjacent the extremity of the whiffle-tree 1, but at the same time it is preferably located at approximately half-way between the extremity of the whiffle-tree and the shoulder 3. Extending transversely across the end of the whiffle-tree 1 is a notch 5.

Fitted upon the reduced portion 2 of the whiffle-tree 1 and having its inner end abutting the shoulder 3 is a sleeve 6. In Figs. 1, 2 and 3 of the drawings, the sleeve 6 is shown as comprising two sections 7 and 8. The sections 7 and 8 are arranged in alinement and are provided at their adjacent or abutting edges with a pair of opposing notches 9, which form in the complete sleeve a pair of apertures 10 and 11 in opposite sides of the latter. The apertures 10 and 11 are arranged in alinement with the notch or groove 4 which extends transversely across one side of the reduced portion 2 of the whiffle-tree 1.

The hitching element proper is in the form of a ring 12 which passes through the apertures 10 and 11 and which has a portion disposed in and retained in the notch or groove 4 by the portions of the sleeve sections 7 and 8 which are disposed between the pairs of notches 9.

In order to secure the sleeve 6 upon the reduced portion 2 of the whiffle-tree 1, a cap 13 is used. This cap 13 is shown in Figs. 1, 2, 3 and 4 as being in the form of a circular disk and is placed over the end of the whiffle-tree 1 and the outer end of the sleeve 6. The inner side or face of the cap 13 is provided with a transversely extending rib 14 which fits in the groove 5 formed in the end of the whiffle-tree 1. The ends of the rib 14 are flush with the edges of the cap or disk 13 and are disposed in notches 15 which are arranged in the outer edge of the sleeve 6. To retain the cap 13 in this position, a screw 16 is passed through its central portion into the end of the whiffle-tree 1.

The rib 14 of the cap 13 fitting in the groove 5 in the end of the whiffle-tree 1, prevents the cap 13 from rotating upon the end of the whiffle-tree 1, and the end portions of the rib 14 fitting in the notches 15 of the sleeve 6 prevent the latter from rotating either with respect to the cap 13 or the whiffle-tree 1.

In Figs. 5, 6, 7, 8, 9 and 10 of the drawings, the whiffle-tree is constructed as hereinbefore described, but the sleeve and cap which are used are of slightly different constructions. In these views, the sleeve, designated as 6', is made in one piece and is preferably longitudinally split as at 17. The apertures 10' and 11' are located on opposite sides of the point 17 where the sleeve 6' is split. The outer edge of the sleeve 6' is provided the same as is the sleeve 6 with a pair of oppositely disposed notches 15'.

The cap 13' shown in Figs. 5 to 10 inclusive of the drawings, comprises a circular disk, the diameter of which is equal to the inside diameter of the sleeve 6' so that it will fit entirely within the outer end portion of the sleeve 6'. In this connection, it will be noted that the outer end portion of the sleeve 6' projects a slight distance beyond the end of the whiffle-tree 1. The cap or disk 13' is provided on its inner side or face with a rib 14' which fits in the groove 5 in the end of the whiffle-tree 1 and projecting from opposite edges of the cap or disk 13' are lugs 18 which fit in the notches 15' of the sleeve 6'. The cap or disk 13' is retained on the end of the whiffle-tree 1 by means of a screw 16' and if desired a circular plate or disk 19 may be placed flat against the outer side or face of the cap or disk 13', this plate or disk 19 being of the same size in diameter as is the outer diameter of the sleeve 6' so as to entirely cover the end of the latter.

In either type of sleeve, the ring 12 is retained in the groove or notch 4 by the sleeve, and the latter is non-rotatably secured in place upon the end of the whiffle-tree by means of the cap. Where the one-piece sleeve is used, the ring 12 may be inserted in place before its ends are brought together and welded or fastened, but where the two-piece or two section sleeve 6 is used, the section 7 may first be put in place and then the complete ring 12 may be put in place, after which the section 8 and cap 13 may be assembled.

From the foregoing description, taken in connection with the accompanying drawings, the construction, use and advantages of the invention will be understood so that further explanation is thought to be unnecessary, other than to say that since the device is very simple in construction, it can be easily and cheaply manufactured, and also it is of such construction that it can be easily applied to a whiffle-tree, neck-yoke or the like.

It is obvious that various changes in form, proportion, and in the minor details of construction may be resorted to without departing from the spirit and principle of the invention or sacrificing any of the advantages thereof, and hence it is to be understood that such changes may be made within the meaning and scope of the appended claims.

What is claimed is:

1. In a device of the class described, the combination of a whiffle-tree or the like having a notch extending transversely across one side adjacent one end thereof, a sleeve fitted and secured upon said end of said whiffle-tree, said sleeve having apertures in opposite sides in alinement with said notch, and a ring passing through said apertures and having a portion disposed in said notch and maintained therein by said sleeve.

2. In a device of the class described, the combination of a whiffle-tree or the like having a notch extending transversely across one side adjacent one end thereof, a pair of longitudinally alined sleeve sections fitted and secured upon said end of the whiffle-tree, the adjacent edges of said sleeve sections being provided with pairs of notches which are arranged in opposing relation so as to form apertures in alinement with the notch of the whiffle-tree, and a ring passing through said apertures and having a portion disposed in the notch of the whiffle-tree and maintained therein by said sleeve sections.

In testimony whereof I have hereunto affixed my signature.

EVERETT N. BUTTERFIELD.